United States Patent
Huth

(10) Patent No.: US 10,466,060 B2
(45) Date of Patent: Nov. 5, 2019

(54) METHOD FOR OPERATING A NAVIGATION SYSTEM OF A MOTOR VEHICLE, AND MOTOR VEHICLE

(71) Applicant: Audi AG, Ingolstadt (DE)

(72) Inventor: Andre Huth, Ingolstadt (DE)

(73) Assignee: Audi AG, Ingolstadt (DE)

( * ) Notice: Subject to any disclaimer, the term of this patent is extended or adjusted under 35 U.S.C. 154(b) by 26 days.

(21) Appl. No.: 15/309,427

(22) PCT Filed: Apr. 14, 2015

(86) PCT No.: PCT/EP2015/000784
§ 371 (c)(1),
(2) Date: Nov. 7, 2016

(87) PCT Pub. No.: WO2015/169420
PCT Pub. Date: Nov. 12, 2015

(65) Prior Publication Data
US 2017/0176206 A1   Jun. 22, 2017

(30) Foreign Application Priority Data

May 6, 2014   (DE) .................. 10 2014 006 561

(51) Int. Cl.
*G01C 21/36* (2006.01)
(52) U.S. Cl.
CPC ....... *G01C 21/362* (2013.01); *G01C 21/3679* (2013.01)
(58) Field of Classification Search
CPC ............ G01C 21/3484; G01C 21/3605; G01C 21/3667; G01C 21/3679; G01C 21/3691;
(Continued)

(56) References Cited

U.S. PATENT DOCUMENTS 6,381,534 B2 *  4/2002  Takayama .......... G01C 21/3626
                                                  348/552
7,047,247 B1    5/2006  Petzold et al.
(Continued)

FOREIGN PATENT DOCUMENTS

CN   102538794 A   7/2012
CN   102682128 A   9/2012
(Continued)

OTHER PUBLICATIONS

English-language abstract of German Patent Application Publication No. 102009037869 A1, published Apr. 15, 2010; 2 pages.
(Continued)

*Primary Examiner* — Courtney D Heinle
*Assistant Examiner* — Luis A Martinez Borrero
(74) *Attorney, Agent, or Firm* — Sterne, Kessler, Goldstein & Fox P.L.L.C.

(57) ABSTRACT

A method for operating a navigation system of a motor vehicle, wherein upon reception of a destination data record containing a geodetic position and a first address associated with the position. Based on digital map data stored in the navigation system test addresses are created and are geodetically assigned, wherein the test addresses contain at least a street name and are located in the destination region of the position. A second address is selected from the test addresses that with regard to at least one character string describing the test address deviates the least from said first address, wherein, after the level of discrepancy of the second address as compared to the first address is determined to be less than or equal to a maximum value, the navigation system navigates to the second address.

16 Claims, 2 Drawing Sheets

(58) Field of Classification Search
CPC ...... G01C 21/362; G01C 21/00; G01C 21/32; G01C 21/26; H04W 84/045; H04W 88/06; H04W 84/18; H04W 80/10
USPC .................... 701/533, 1, 410, 426, 428, 445
See application file for complete search history.

(56) References Cited

U.S. PATENT DOCUMENTS

| | | | | |
|---|---|---|---|---|
| 7,373,244 | B2 * | 5/2008 | Kreft | G01C 3/08 701/532 |
| 7,646,296 | B2 * | 1/2010 | Ohki | G01C 21/362 340/539.13 |
| 7,999,703 | B2 * | 8/2011 | Ohki | G01C 21/362 340/995.19 |
| 8,102,281 | B2 * | 1/2012 | Ohki | G01C 21/362 340/995.19 |
| 8,134,481 | B2 * | 3/2012 | Ohki | G01C 21/362 340/995.19 |
| 8,193,950 | B2 * | 6/2012 | Ohki | G01C 21/362 340/995.19 |
| 8,193,951 | B2 * | 6/2012 | Ohki | G01C 21/362 340/995.19 |
| 8,793,068 | B2 * | 7/2014 | Armato | H04W 4/90 701/455 |
| 8,996,306 | B2 * | 3/2015 | Kodan | G01C 21/362 701/411 |
| 2003/0083810 | A1 | 5/2003 | Stefan et al. | |
| 2008/0036586 | A1 * | 2/2008 | Ohki | G01C 21/362 340/539.13 |
| 2008/0126090 | A1 * | 5/2008 | Kunstmann | G10L 15/063 704/245 |
| 2009/0006394 | A1 * | 1/2009 | Snapp | G06F 16/2468 |
| 2009/0254273 | A1 * | 10/2009 | Gill | G01C 21/3611 701/431 |
| 2010/0131191 | A1 * | 5/2010 | Ohki | G01C 21/362 340/995.19 |
| 2010/0169003 | A1 | 6/2010 | Van Der Meer | |
| 2010/0184453 | A1 * | 7/2010 | Ohki | G01C 21/362 455/456.3 |
| 2011/0021211 | A1 * | 1/2011 | Ohki | G01C 21/362 455/456.3 |
| 2011/0112761 | A1 * | 5/2011 | Hurley | G01C 21/32 701/465 |
| 2011/0244888 | A1 * | 10/2011 | Ohki | G01C 21/362 455/456.2 |
| 2012/0209509 | A1 * | 8/2012 | Kodan | G01C 21/32 701/411 |
| 2012/0265436 | A1 | 10/2012 | Tkachenko | |
| 2013/0325329 | A1 | 12/2013 | Gupta et al. | |
| 2014/0067260 | A1 * | 3/2014 | Armato | H04W 4/90 701/445 |
| 2014/0067709 | A1 * | 3/2014 | Armato | H04W 4/90 705/338 |
| 2014/0297176 | A1 * | 10/2014 | Armato | H04W 4/90 701/445 |
| 2015/0063700 | A1 * | 3/2015 | Soundararajan | G06K 9/18 382/182 |

FOREIGN PATENT DOCUMENTS

| | | |
|---|---|---|
| DE | 102005016214 A1 | 10/2006 |
| DE | 102009037869 A1 | 4/2010 |
| DE | 102013205087 A1 | 9/2014 |
| EP | 1568970 A1 | 8/2005 |
| JP | 4355048 B2 | 8/2009 |
| WO | WO 01/18768 | 3/2001 |

OTHER PUBLICATIONS

English-language abstract of Japanese Patent Application Publication No. 4355048 B2, published Oct. 28, 2009; 2 pages.
English-language abstract of German Patent Application Publication No. 102013205087 A1, published Sep. 25, 2014; 2 pages.
English-language abstract of German Patent Application Publication No. 102005016214 A1, published Oct. 12, 2006; 2 pages.
International Search Report and Written Opinion directed to related International Patent Application No. PCT/EP2015/000784, dated Jul. 16, 2015, with attached English-language translation; 27 pages.
International Preliminary Report on Patentability directed to related International Patent Application No. PCT/EP2015/000784, dated Jul. 20, 2016, with attached English-language translation; 12 pages.

* cited by examiner

METHOD FOR OPERATING A NAVIGATION SYSTEM OF A MOTOR VEHICLE, AND MOTOR VEHICLE

TECHNICAL FIELD

The invention relates to a method for operating a navigation system of a motor vehicle and to a motor vehicle.

BACKGROUND

Navigation systems for motor vehicles are already sufficiently known in the prior art. Using a suitable position sensor, particularly a GPS sensor, a current geodetic position of the motor vehicle can be determined. A user interface, usually a commonly employed man-machine interface of the motor vehicle, allows selection of a navigation destination, after which the control unit of the navigation system determines an optimal route following specific criteria partly changeable by the user. The driver is guided to its navigation destination via correspondingly issued instructions. For future, semi-autonomous or fully autonomous driving motor vehicles, a complete autopilot guidance with the help of a navigation system is feasible and planned.

To facilitate the navigation, digital map data are used by modern navigation systems that describe available regions of the road network, passable and thus reachable by the motor vehicle. Accordingly, navigation destinations are defined by address information within the map data by default, which means the navigation destination is usually a location contained in the map data passable by the motor vehicle. A guide to geodetic positions outside of the road network described by the map data is therefore normally not provided.

Recently, there were also proposed modern navigation systems, in which a navigation destination must not be entered necessarily via a dedicated user interface of the navigation system, but may be accepted also from other sources external to the navigation system. Such a destination data record may originate, for example, from an Internet source, for example, from an online map system, an online tour guide and the like. Therefore, the user may select a navigation destination externally from the navigation system, for example, a so-called Point of Interest (POI), which is usually determined by a geodetic position, i.e. a position in a geodetic coordinate system that is also the basis of digital map data for comparison with a current geodetic position of the motor vehicle.

The destination data record must be converted into a navigation destination evaluable by the navigation system, wherein the geodetic position is used in the destination data record with known procedures, after which such an address contained in the destination data record may also be optionally another mailing address or the like, that may not necessarily comply with the destination described by the geodetic position. Therefore, it has been proposed to use the geodetic position (often referred to as geo-coordinates) to define the navigation destination. The geodetic position does not necessarily describe a location reachable by the motor vehicle or describe a meaningful access to the destination, since it is usually given out roughly, for example, as the center of previously developed land or the like. Now, known approaches propose, to find the location nearest to the position in the destination data record reachable by the motor vehicle, i.e. an address in described by the map data road network. For this, for example, the distances of the geodetic position to various roads existing around the position in a destination region may be considered, therefore, the decision is ultimately made towards the road. The shortest distance is selected and the corresponding position along the associated road forms the address, which is used as a navigation destination.

However, it was found that particularly if the place described by the destination data record is a larger area, the variant described will not always guide the vehicle to an access to the area, since this may be located at an entirely different position, for example, at the complete opposite side of the block with building developments surrounded by roads. Thus indeed, the user will be guided into the rough surrounding of the destination described by the destination data record, however, he must then find the rest of the way by himself possibly complicated by certain traffic regulations. This is undesirable and may not meet the user's expectations.

Particularly, problems also arise when no house number is present in the immediate vicinity of this road at the point of the shortest distance to a road, so that the navigation target then comprises the address only up the street without the house number and significant deviations occur from the actual destination.

EP 1 568 970 A1 relates to a method of inputting destination data by means of a mobile terminal. Here, the data input into a navigation system should be improved by exploiting the databases present anyway in mobile terminals, which contain information on individuals and organizations that are of interest to the corresponding user. Address data serve as input, wherein destination data are to be derived from these address data, to which the navigation system may guide. The plausibility of the transmitted address may be verified by an address database and corrected, if necessary.

US 2013/325329 A1 relates to the update of geographic data in a database based on user input, wherein a name and a position of a point of interest (POI) are received, thus an information tuple. This information tuple consisting of position and name is compared to information tuples in the database to the effect, if both the name and the position match. If this is the case, a reliability value (confidence value) is increased, if this is not the case, the POI is stored as the new POI, at least temporarily.

DE 10 2005 016 214 A1 discloses a navigation system and a navigation method with the ability to import and export of special destinations and navigation maps. In a digitized region, addresses are stored with their associated geographical coordinates in the navigation information. For example, from a digital signature in Outlook, destinations may be imported via a bidirectional interface. If the destination cannot be directly driven to, a map section around the destination is displayed.

SUMMARY

Therefore, the invention is based on the task to provide an improved, more intelligent way to define a navigation destination by using all available information.

To solve this task, an inventive method for operating a navigation system of a motor vehicle is provided with the features of claim 1.

Thus, the invention makes use of the fact that destination data records assigned to certain destinations in addition to the geodetic position of the destination also contain address information, which is, however, as already indicated, not necessarily identical to the geodesic position. Thus, the map data is used to verify whether or not the first address contained in the destination data record, particularly the corresponding road, which is described by a road name, is actually located in the vicinity of the position, i.e. a destination region. In this context, a level of discrepancy is evaluated, as it often happens that, for example, road names or other location information are contained, the spelling of which differs from that in the various databases. Consequently, a certain slight discrepancy between a road name in the destination data record and a road name may be found in the digital map data of the navigation system, although the same street is referred to. Therefore, a maximum value for the level of discrepancy is used, which must be undershot so that the roads indicated by the road names or addresses in general can be assumed to be identical. In this manner, it will be verified whether it is possible that the first address of the destination data record is actually located near the geodetic position. If this is the case, this correlation. i.e. the first address is used for orientation, which means for navigation to the destination.

It is expedient here that, if the level of discrepancy of the second address from the first address exceeds the maximum value, a third address spatially closest to the position reachable with the motor vehicle is selected from the map data and the navigation system is operated to navigate to the third address. In this case, the third address may also be selected from the test addresses, but it is also conceivable to redefine it. This corresponds to the method previously described with respect to the prior art, in which the spatially closest location to the geodetic position of the destination data record that is definable as a navigation destination in the digital map data is searched and guided to. Therefore, this is a "fallback" solution, if the destination data record thus offers no useful information to choose a more useful navigation destination. It should be noted that it is basically also conceivable to use other methods to select the third address, when exceeding the level of discrepancy, which is also based on the geodetic position.

In this manner, additional address information contained in the destination data record, i.e. the first address, will be used to define a more useful navigation destination, if deemed plausible on the basis of the present digital map data and the geodetic position. In this way, situations are avoided, in which the user of the navigation system is routed to an unfavorable navigation destination, although information on a more useful navigation destination had already been included in the destination data record. For this purpose, the physical-technical issues, namely location information in a geodetic coordinate system are used to verify the plausibility of additional physical location information in the destination data record and their consideration in the selection of the navigation destination.

It should be noted again that it may be sufficient to form an address for the purposes of the invention to provide a road name or a corresponding name of a location at a particular location, which means that the presence of house numbers is not absolutely necessary. This will be explained in more detail in the following. Depending on the structure of the map data specific roads may represent edges within the road network described by the digital map data, crossings of several streets then form nodes. In this regard, for example, it would be provided to locate adjacent edges of the geodetic position in the destination region and to evaluate its designation, particularly the road names to the extent to which they might correspond to the first address of the destination data record.

Specifically, it can be provided that the destination region comprises a predetermined dimension to the position with particularly strong expansion in the range of 100 to 500 m, or the expansion of the destination region is selected depending on the number of test addresses found within various test regions. In practice, a predetermined expansion of about 200 meters has been proven useful to define a square or circular search area where roads and related locations may be found. However, if a plurality of destination locations corresponding to destination data records is expected that are significantly further away from navigable areas, covered by the road network of the digital map data, it may also be expedient to extend the search area successively, for example, as a test area until addresses may be found that may serve as a basis for a navigation destination. It should be noted that such spatial restrictions may of course also be suspended in the calculation of a third address; accordingly a third address could be searched using a larger destination region or even without restriction if within an expansion predetermined within a destination range no test address could be found. Of course, a maximum distance limitation is conceivable, above which a notification is output to the user, for example, "there's no road leading to this destination".

As already mentioned, the test addresses may be characterized in that they only refer to road names, which are compared with corresponding road names of the first address. If more accurate test addresses are determined, it is nevertheless expedient keeping the number of test addresses small, for example, to reduce to one per street. This way, it may be provided that, particularly in addition to the road name additional data containing test addresses the number of test addresses is reduced prior to the comparison with the first address based on a redundancy criterion, particularly for each road name only maintaining a test address located nearest to the position. This is particularly useful if, for example, house numbers or the like be considered in addition, since in cases where a house number cannot be determined from other data, a house number is immediately available for the second address to which it can be driven to. However, it is more preferable for the test addresses to look initially only at streets, where a house number or the like can be determined at a later point in time, which will be explained in greater detail below.

As a level of discrepancy, a Levenshtein measure may be used appropriately. Such a distance measure for character strings is already generally known in the prior art and indicates how many changes are required to pass from one character string to another character string. Consequently, the Levenshtein measure is particularly suitable for comparison of road names.

Accordingly, a useful embodiment also provides that the address comparison performed is restricted to the road name. It is usually sufficient to determine whether the road specified in the first address actually exists in the destination region to regard the first address as sufficiently plausible describing the geodetic position.

Nevertheless, a more detailed second address (particularly containing a house number) is expedient as a navigation destination so that a preferred embodiment of the present invention provides that it is checked for a second address given as a navigation destination whether the first address contains a house number in which the road confirmed by the comparison of the road name of the second address exists, and if existing this house number is selected. It is thus determined whether the house number contained in the first address according to the digital map data exists after all in the road designated by the road name. If this is the case, it can be assumed that this house number is correct, and it is transferred to the second address before it is selected as the navigation destination. If the house number does not exist according to the digital map data, alternatively a house number may be determined in other ways, wherein the corresponding measure is applicable in the map data also in other cases than in the non-existence of the house number.

Thus, a development of the invention provides that the nearest house number is selected in case of no house number being contained in the first address and/or in case of non-existence of a house number contained in the first address in the comparison of road names confirmed by the second address in accordance with the map data and/or in case of too large spatial and/or numerical distance between a house number of the first address in the road name confirmed by comparison of the road name of the second address according to the map data and the position or a house number nearest to the position in the road name confirmed by comparison of the second address line according to the map data and the position or a house number nearest to the position in the road name confirmed by comparison of the road name of the second address.

As a kind of "fallback" solution for a house number non-existent for the street in the destination data record or the map data or when an additional check determines that the house number mentioned in the destination data record is clearly too far away from the geodetic position a house number for the navigation destination may be determined with the second address by using the house number nearest to the geodetic position on the road designated by the road name of the second address to define the navigation destination more precisely. In principle, it is even possible, to guide the user just to the street per se, however, it is more expediently to guide the user as close as possible to his/her destination.

The destination data record is obtained from an Internet source. Examples of such Internet sources are Internet map systems and route planners, tour guides, event services, which provide a corresponding POI to an event and the like. The source of the destination data record does not necessarily need to be the Internet, since, for example, an app of a mobile phone connected to a motor vehicle may transmit corresponding destination data records to the motor vehicle, and the like.

It is expedient if the navigation to the second and/or third address is carried out only after a confirmation of the respective address by a user. That means that as soon as the second and the third address are selected, for example, via an appropriate user interface of a man-machine interface, it is first displayed to the user who may confirm it before the actual destination guidance to the navigation destination begins.

In addition to the method, the invention also relates to a motor vehicle, comprising a navigation system with a control unit embodied for carrying out a method of the inventive type. All embodiments relating to the inventive method can be transferred to the inventive motor vehicle in the same manner, whereby consequently also the advantages mentioned above may be obtained.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Additional advantages and details of the present invention are shown in the embodiments described hereinafter and from the drawing. They show the following:

DETAILED DESCRIPTION

Figure 1:
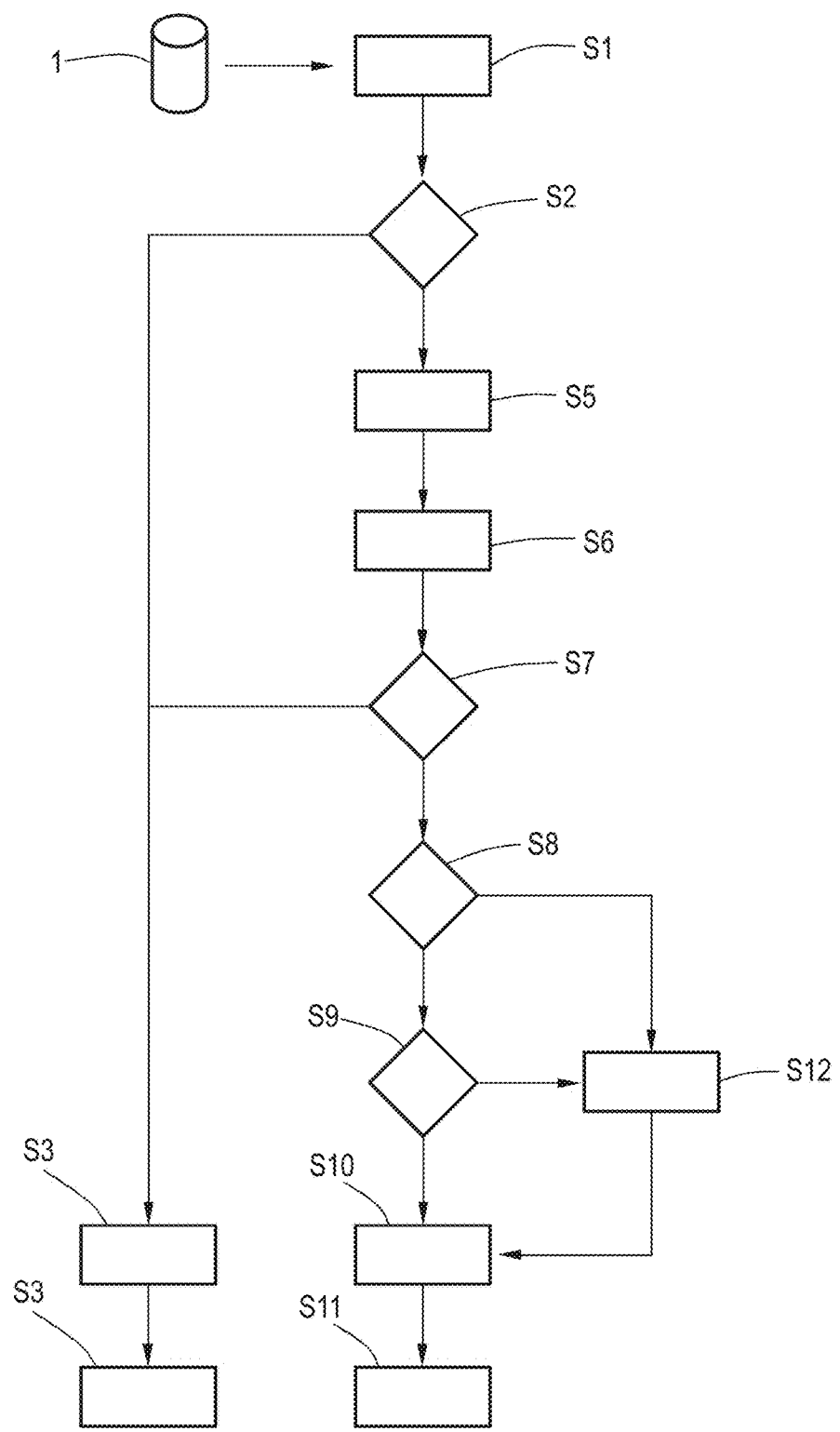
FIG. 1 is a flow chart of an embodiment of the inventive method.

FIG. 1 shows a flow chart of one embodiment of the inventive method, in which in a step S1 a destination data record 1, in this case from an Internet source, is passed on to a navigation system of a motor vehicle. Using a geodetic position and an address, the destination data record 1 describes a destination to which a driver of the motor vehicle would want to be guided to. From this destination data record, a navigation destination suitable for the navigation system shall be derived, which is the purpose of the method illustrated here.

Figure 2:
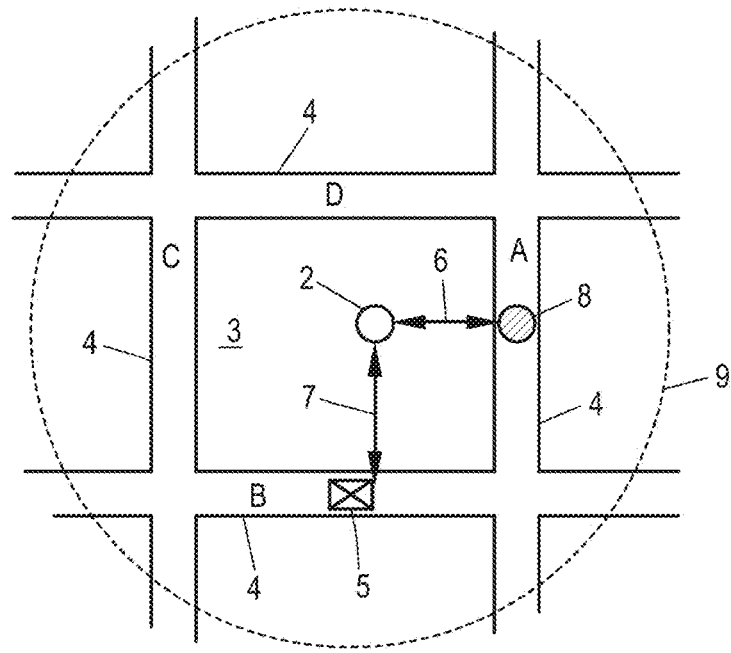
FIG. 2 is a sketch explaining the method.

The relationships are shown again in the schematic diagram of FIG. 2. The geodetic position 2 is located visibly within a building block 3, which is bounded by four roads 4, which are also stored in the digital map data of the navigation system. In this case, simplified road names were chosen in the example so that the road to the right of position 2 is the A road, below position 2 is the B road, to the left of position 2 is the C road and above the position 2 (north) is the D road. The first address 5 contained in the destination data record 1 is located on the B road.

If one proceeds as known from the prior art, one would find that the position 2 is nearest to the A road, which means the shortest distance 6 from the geodetic position 2 to the A road is less than the shortest distance 7 from the geodetic position 2 to the B road. Hence, according to the prior art, a navigation system based solely on the geodetic position 2 would conclude that the driver would have to be guided onto A road, for example, to the nearest house number of the A road to a third address 8. However, then the driver would once again have to drive around the entire block to find the actual access to the destination.

Instead, the embodiment shown in FIG. 1 of the inventive method uses the first address 5 also contained in the destination data record 1 to the effect of achieving an improvement.

In a step S2, it is first checked whether the destination data record 1 even contains a first address. If this is not the case, the spatially nearest third address 8 is determined by the control unit of the navigation system in a step S3 and will be used as a navigation destination, as known in the prior art, which is driven to in a step S4. Then there is no additional information that could be used for a more plausible option.

However, the case should be assumed that the destination data record 1 also includes a first address 5 so that the continuation takes place in step S5. In that step, test addresses are determined in a destination region 9, see FIG. 2, that can be used as a navigation destination. The destination region 9 extends in this case to a diameter of 200 m around the geodetic position 2. After the usefulness of the first address 5 should be determined in this case based on the road names, only the corresponding roads 4 contained in the map data of the navigation system for the destination region 9 are selected initially as test addresses, in this case, therefore, receiving the A road, the B road, the C road and the D road as test addresses at the respective location.

In a step S6, then, discrepancy information is determined for each road name of the test addresses as compared to the road name of the first address 5, i.e. for the B road. As can be seen in the present simple example, once the Levenshtein measure is used as a level of discrepancy, the smallest discrepancy is with the B road, as it is identical to the road name of to the corresponding test address. In the abstract embodiment of FIG. 2, the level of discrepancy would be one for the A road, the C road and the D road, since only one letter needs to be changed; in practice, road names are longer and more complex, of course, so the levels of discrepancy are greater in unequal road names and smaller discrepancies occur only with differently written road names designating the same road 4. The test address with the smallest discrepancy, in this case "B road" is selected in step S6 as a second address.

In step S7, it is checked whether the level of discrepancy exceeds a maximum value, consequently indicating the tolerance for variant spellings of the same road 4. For the Levenshtein measure such a maximum value may be, for example, "3." If the level of discrepancy is now greater than this maximum value, it is assumed that the first address 5 and the test address refer to different roads and that, thus, the road specified in the first address 5 is not located in the destination region 9. If this is the case, reference is made to the previous method for determining a navigation destination in steps S3 and S4, as shown also in FIG. 1.

However, if the case occurs as in the example of FIG. 2 that the road name of the second address selected one from the test address in step S6 corresponds to the first address, step S8 continues in which it is checked whether a house number is also contained in the first address 5. If this is the case, two additional checks will take place in step S9. First, it is checked based on the map data of the navigation system whether the house number mentioned in the first address 5 exists on the road designated by the road name of the second address. If this is the case, an optional, second check takes place, namely, checking whether the second address completed by the house number of the first address is located sufficiently close to the geodetic position 2, for example, within the destination region 9. This is the case in the example of FIG. 2. If these two checks apply in step S9, the second address is supplemented by the house number of the first address in step S10 and used as a navigation destination. In a step S11, then the navigation to the second address takes place.

If it is determined in step S8 that the first address 5 contains no house number or if it is determined in step S9 that the number of the first address according to the map data does not exist or lies far away from position 2, an attempt is made in a step S12, to supplement an appropriate number for the second address by searching for the nearest house number of the road name of the second address designated as street 4 relative to position 2. This house number is then added to the second address, which is then in turn selected in step S10 as a navigation destination.

In this way, improved guidance to the desired destination is enabled.

Figure 3:
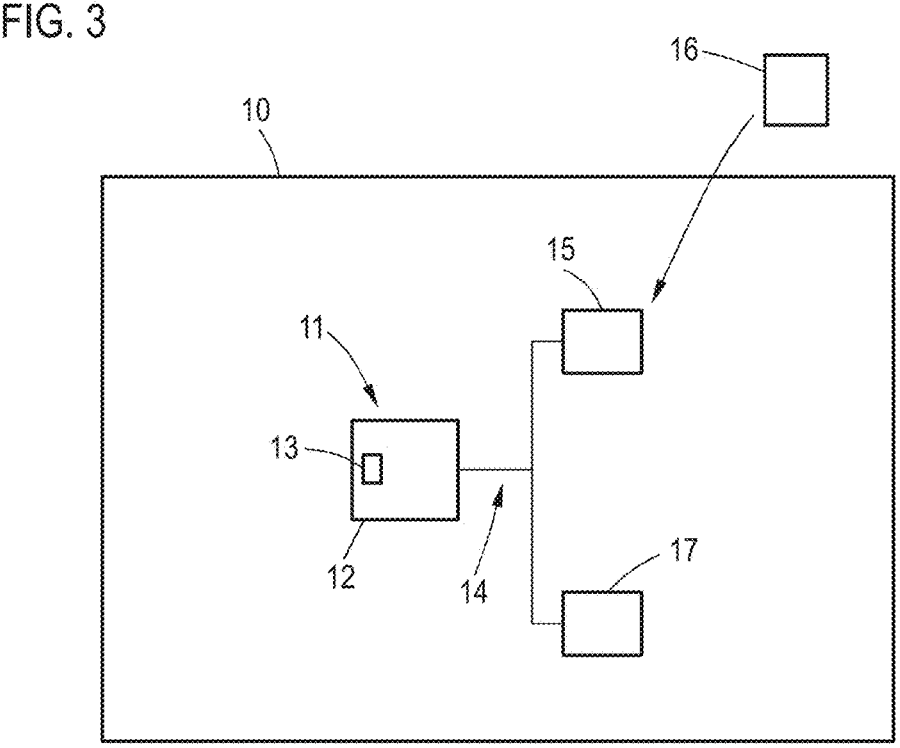
FIG. 3 is an inventive motor vehicle.

FIG. 3 finally shows a schematic diagram of an inventive motor vehicle 10. This invention comprises a navigation system 11 with a control unit 12 which is embodied to carry out the inventive method. Also the digital map data 13 are stored within the control unit 12. The control unit 12 is connected to a bus system 14, for example, a CAN bus, of the motor vehicle 10, so that it can exchange data with other vehicle systems, for example, with a control unit 15, through which a connection to the Internet has been established. Then a destination data record 1 retrieved from an Internet source 16 can be passed on to the control unit 12.

Furthermore, the navigation system 11 has access to a man-machine interface 17 via the bus system 14, with which, of course, also the control unit 15 can communicate. Via the man-machine interface 17, it is also possible to have a determined second or third address confirmed by the user again before guidance to the navigation destination is started according to step S4 or S11.

The invention claimed is:

1. A method for operating a navigation system of a motor vehicle, comprising:
   receiving a first geodetic position and a first address assigned to the first geodetic position from a destination data record obtained from an Internet source;
   determining test addresses accessible to the motor vehicle based on geodetic assignable digital map data available to the navigation system, wherein each of the test addresses comprise at least one street name in a destination region describing geodetic positions;
   comparing a character string describing the first address with character strings describing the test addresses;
   selecting a second address from the test addresses based on the character string comparisons, wherein a character string describing the second address, as compared to the character strings describing the other ones of the test addresses, deviates a least from the character string describing the first address;
   determining a level of deviation between the first address and the second address;
   comparing the level of deviation against a predetermined threshold; and
   operating the navigation system, based on the comparison against the predetermined threshold, to navigate the motor vehicle to the second address.

2. The method according to claim 1, further comprising:
   comparing the first geodetic position with geodetic positions of the test addresses;
   selecting a third address of the test addresses when a level of deviation between the first geodetic position and a second geodetic position exceeds a predetermined threshold and a geodetic position of the third address is spatially closest to the first geodetic position, as compared to the geodetic positions of the other ones of the test addresses; and
   operating the navigation system to navigate to the third address.

3. The method according to claim 1, wherein the destination region is defined by a predetermined dimension around the first geodetic position.

4. The method of claim 3, wherein the predetermined dimension is from 50 meters to 300 meters around the first geodetic position.

5. The method according to claim 3, wherein the predetermined dimension is determined based on a number of the test addresses found within a test region.

6. The method according to claim 1, further comprising reducing a number of the test addresses to one test address located nearest to the first geodetic position, when the one test address contain street names and additional data, prior to a comparison with the first address based on a redundancy criterion.

7. The method according to claim 1, wherein a Levenshtein measure is used to determine the level of deviation.

8. The method according to claim 1, wherein the character string comparisons are carried out using a street name.

9. The method according to claim 8, wherein selecting the second address from the test addresses further comprises:
  determining, based on the geodetic assignable digital map data, whether the first address includes a house number;
  confirming the house number of the first address by comparing a street name of the first address with a street name of the second address; and
  selecting the house number of the first address and associating the house number of the first address with the second address.

10. The method according to claim 9, further comprising selecting a house number nearest to the first geodetic position, as compared to house numbers located on the street name of the second address, when the first address contains no house number.

11. The method according to claim 1, wherein operating the navigation system to navigate the motor vehicle to the second address occurs only after a user confirms the second address.

12. A motor vehicle comprising:
  a navigation system with a control unit, wherein the control unit is configured to:
    receive a first geodetic position and a first address assigned to the first geodetic position from a destination data record obtained from an Internet source;
    determine test addresses accessible to the motor vehicle based on geodetic assignable digital map data available to the navigation system, wherein each of the test addresses comprise at least one street name in a destination region describing geodetic positions;
    compare a character string describing the first address with character strings describing the test addresses;
    select a second address from the test addresses based on the character string comparisons, wherein a character string describing the second address, as compared to the character strings describing the other test addresses, deviates a least from the character string describing the first address;
    determine a level of deviation between the first address and the second address;
    compare the level of deviation against a predetermined threshold; and
    operate the navigation system based on the comparison against the predetermined threshold, to navigate the motor vehicle to the second address.

13. The motor vehicle according to claim 12, wherein the control unit is further configured to:
  compare the first geodetic position with geodetic positions of the test addresses;
  select a third address of the test addresses when the level of deviation between the first geodetic position and a second geodetic position exceeds a predetermined threshold and a geodetic position of the third address is spatially closest to the first geodetic position, as compared to the geodetic positions of the other test addresses; and
  operate the navigation system to navigate to the third address.

14. The motor vehicle according to claim 12, wherein the destination region is defined by a predetermined dimension around the geodetic position.

15. The motor vehicle according to claim 14, wherein the predetermined dimension is from 50 meters to 300 meters around the first geodetic position.

16. The motor vehicle according to claim 14, wherein the predetermined dimension is determined based on a number of the test addresses found within a test region.

* * * * *